Dec. 21, 1943.  A. O. WILLIAMS  2,337,287

UNIVERSAL JOINT

Filed Feb. 24, 1941

INVENTOR.
Alfred O. Williams
BY Earl D. Chappell
ATTORNEYS.

Patented Dec. 21, 1943

2,337,287

UNITED STATES PATENT OFFICE 2,337,287

UNIVERSAL JOINT

Alfred O. Williams, Battle Creek, Mich.

Application February 24, 1941, Serial No. 380,106

10 Claims. (Cl. 64—14)

This invention relates to improvements in universal joints.

The main objects of my invention are:

First, to provide a cushioned universal joint between two shaft sections to compensate for misalinement of the sections, said joint being of improved, simplified construction.

Second, to provide a rubber cushioned universal joint of the type described for a pair of shaft sections serving to electrically insulate the sections if such is desired and resiliently transmitting torque through the rubber cushioning provisions thereof so as to resist damage to the shaft parts due to misalinement.

Third, to provide a universal joint construction of the foregoing character which is made of simple, inexpensive cast or stamped parts, readily and quickly assembled by inexperienced persons into a unitary coupling assembly suitable for ready installation on the desired shaft parts.

Further objects relating to details and economies of my invention will appear from the description to follow. The invention is defined in the claims.

A structure embodying the features of my invention is illustrated in the accompanying drawing, wherein.

Figure 1:
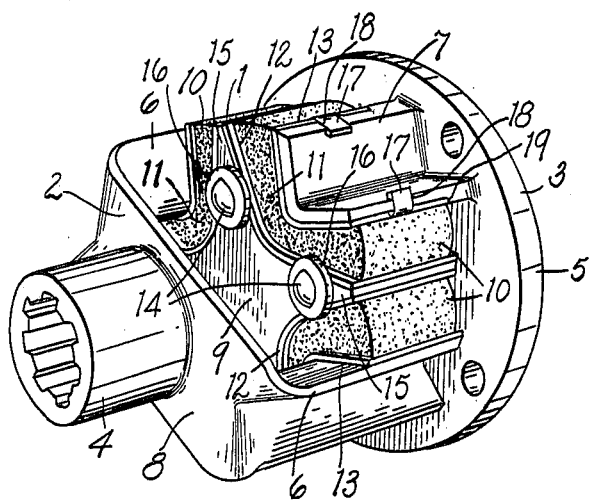
Fig. 1 is a perspective view illustrating the universal cushioned coupling in a preferred form.

The present invention relates to rubber cushioned universal joints or couplings of the type illustrated and described in my Patent No. 2,219,144 of October 22, 1940, and more particularly to simplifications in the structure shown in that patent, whereby the same is substantially compacted and reduced in cost while still performing all of the functions for which it is intended, which are described at length in said patent.

Referring to the drawing, the reference numeral 1 in general indicates the joint or coupling of my invention adapted for transmitting torque between a pair of shaft sections (not shown) in such manner as to accommodate misalignment of the sections and likewise to electrically insulate the same if such a feature is desirable in certain installations.

The joint consists of a pair of shaft or adaptor members 2, 3 respectively, the former of which has a splined central boss 4 for driving connection to one shaft and the latter of which includes an attaching plate 5 adapted to be bolted to a further shaft section. The specific mode of attaching the two members 2, 3 to the respective shaft sections is unimportant and it will be appreciated that both members might be provided with splined connectors, or, alternatively, with the plate-like provisions, this feature per se constituting no part of my invention.

Each of the connector members 2, 3 is provided with axially projecting torque transmitting arms, those on the member 2 being designated 6 and those on the member 3 being indicated by the numeral 7. These arms are disposed diametrically opposite one another in each pair, as shown, and are conformed in rectangular V section, the apices of the sections pointing inwardly radially of the coupling. The arms of the respective members 2, 3 are in substantial axially overlapping relationship. The shaft members may each be formed as an integral forging, or the arms 6 and the plate-like body 8 of member 2 may be formed as a stamping and welded to the shaft receiving boss 4. However, the particular method by which the parts are fabricated in the above described form does not constitute a part of this invention. It should be noted that the torque arms on each of the driving and driven members are external arms and that the stress on each thereof is equal in the operation of the joint. Likewise, it will be appreciated, as the description proceeds, that the two pairs or sets of torque arms are very simple and readily and economically produced, this being made possible by the further details of the assembly to be described, and that they effectively perform their functions without loss of strength or efficiency in the joint as a whole, notwithstanding their simplicity.

Figure 3:
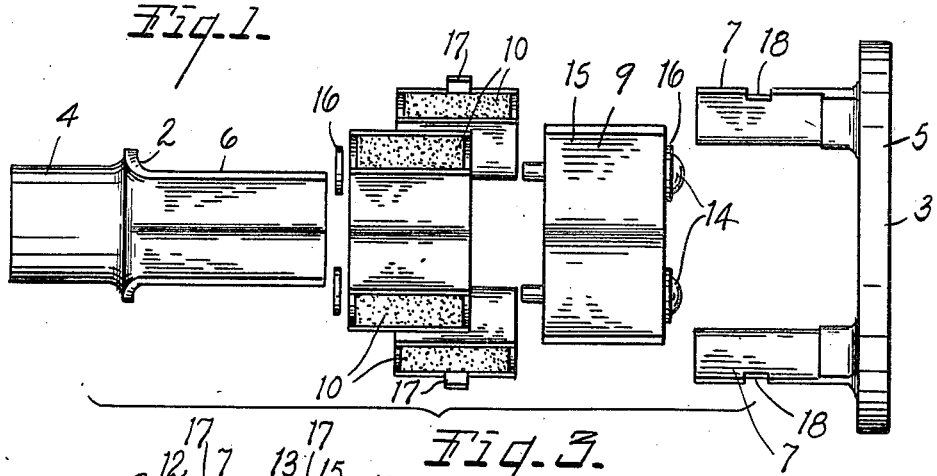
Fig. 3 is an exploded view more clearly illustrating the formation and arrangement of the parts and the manner of assembling the latter.
Figure 2:
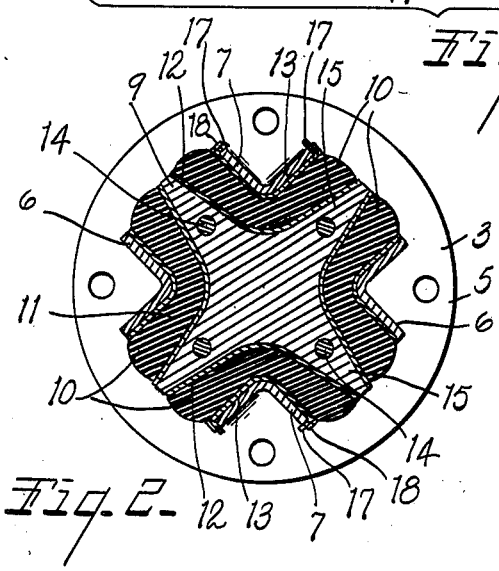
Fig. 2 is a view in transverse section further illustrating details of construction and arrangement of the component parts of the coupling.

Referring to Figs. 2 and 3, the reference numeral 9 indicates a center member of substantial axial length and of generally cruciform or star-like outline. This center member is, in assembled position of the parts, overlapped substantially by both the pairs or sets of arms 6, 7, which latter being arranged in opposed relation and in angularly staggered position, alternate with one another. Member 9 serves as an internal sustaining support for the elastic cushioning units, generally indicated 10, which are interposed between the same and the pairs of arms 6, 7, maintaining the units in proper angular disposition and, with the arms, transmitting in torque the direction of rotation of the joint. The member 9 likewise serves as a base element for initially securing the cushioning units together as a unit in intended operative relation to one another and preventing lateral or axial displacement thereof from said relation.

Each of the cushioning units 10 consists of an elastic body portion 11 of rubber, "neoprene," or other suitable rubber substitute, bonded or cohered on opposite sides thereof to the opposed inner and outer thin metallic angle plates 12, 13 respectively, which latter are of differing angularity, the outermost plates being at a substantially sharper angle conforming to the cross section of the arms 6, 7, than the innermost, whereby an outwardly divergent section is created commencing at the center of the elastic body 11 and advancing outwardly thereof. These cushioning and torque transmitting units 11 are assembled by any suitable bonding operation, as by vulcanizing. In operative assembled position they are each compressed as indicated by the outward bulging of the body 11 therebetween and slipped into the space between the opposed axially overlapping arms 6, 7 and the center star-like sustaining member 9. They are held in axial relation relative to the latter by means of tie bolts or rivets 14 extending through the radially projecting fingers 15 of the center member, the said bolts having enlarged heads or washers 16 laterally overlapping the plates 12, 13 of the cushioning units 11 at both ends so as to prevent relative axial displacement of the cushioning units and center member.

In order to hold the thus assembled center and cushioning units onto one of the connector members, in this case the member 3, I provide the outermost bonding plates 13 with bendable tongues 17 engageable in recesses 18 formed in the opposed pair of torque receiving arms 7. This enables the assembled cushioning and center unit to be mounted in its entirety on one of the connector members in operative relation to the torque arms thereof prior to association of the other member therewith in the manner illustrated in Fig. 1.

It will be noted that the inner surfaces of the opposed arms 7 are rabbeted or recessed at 19 over an area corresponding to the area of the plates 13 for receiving and locating the cushion units. Similar provision may of course be incorporated in the arms 8, though I have not illustrated the same.

In operation it will be understood that the star-like center or base member is dynamically idle, in the sense that it is not direct or rigidly connected to either of the shaft members and acts merely as an intermediate thrust or torque transmitting agent between adjacent cushioning elements, whereby the torque is transmitted from the pair of arms 6 to the pair of arms 7, or vice versa. Torque is transmitted by compression and shearing stress, as described in my patent identified above, but the whole structure is greatly simplified and improved in practicality from a manufacturing standpoint, not only in cost of material and expense of fabricating the same, but in the ease and economy of the assembling operations. Further, the structure of my present invention is usable where there is substantial angularity in the relationship of the driving and driven shaft sections or members. No special connectors for the driving and driven shaft sections are called for, it being understood that the splined boss 4 and attaching plate 3 employed for this purpose are of conventional or standard design adapted for installation in numerous types of drives.

Broadly considered, the invention resides in a coupling or joint having externally arranged, alternating drive arms, with elastic cushioning units interposed at equal intervals between the same and a central star-like or generally cruciform torque transmitting or base member, which latter is unconnected in a rigid manner to any other part and is hence dynamically inactive other than as an intermediate torque transmitting and cushion supporting agent. Serious misalinements of the shaft sections are readily accommodated by this arrangement without destructive wear or stress on the rigid metal parts.

I have illustrated and described my improvements in an embodiment which is very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A cushioned universal joint of the type described comprising driving and driven members each having axially extending external torque arms provided with angular faces, the arms of said respective members being arranged in angularly alternating and axially overlapping relation to one another, a star-like center member interposed between said members for transmitting torque from the driving member to the driven member regardless of axial misalinement of the members, said center member being otherwise drivingly unconnected to said members and having radially projecting fingers disposed between the adjacent sides of alternate arms on said coacting members in spaced relation thereto, and an elastic cushioning element disposed in the space between the sides of each arm and the fingers adjacent the same, said elements having angular metal plates bonded to opposite sides thereof and in axially restrained engagement with the faces of said arms and said fingers respectively with said element under compression, said center member being structurally separate and distinct from said cushioning elements and independently assembled with the same and with said driving and driven members to constitute said joint.

2. A cushioned universal joint of the type described comprising driving and driven members each having axially extending external torque arms provided with angular faces, the arms of said respective members being arranged in angularly alternating and axially overlapping relation to one another, a star-like center member interposed between said members for transmitting torque from the driving member to the driven member regardless of axial misalinement of the members, said center member being otherwise drivingly unconnected to said members and having radially projecting fingers disposed between the adjacent sides of alternate arms on said coacting members in spaced relation thereto, and an elastic cushioning element disposed in the space between the faces of each arm and the fingers adjacent the same, with said element under compression, and means for securing said elements against axial displacement to one of said members and permitting axial sliding displacement relative to the arms of the other member, said center member being structurally separate and distinct from said cushioning elements and independently assembled with the same and with said driving and driven members to constitute said joint.

3. A cushioned universal joint of the type described comprising driving and driven members each having axially extending external torque arms provided with angular faces, the arms of said respective members being arranged in angularly alternating and axially overlapping relation to one another, a star-like center member interposed between said members for transmitting torque from the driving member to the driven member regardless of axial misalinement of the members, said center member being otherwise drivingly unconnected to said members and having radially projecting, axially elongated fingers disposed between the adjacent sides of alternate arms on said coacting members in spaced relation thereto, the side faces of said fingers and the adjacent torque arms being disposed at an angle to one another to define outwardly divergent spaces between the adjacent fingers and arms, an elastic cushioning element having outwardly divergent sides disposed under compression in the space between the faces of each arm and the fingers adjacent the same, means to maintain the cushioning elements in predetermined axial relation, and means for securing said elements to one of said members and permitting axial sliding displacement relative to the arms of the other member, said center member being structurally separate and distinct from said cushioning elements and independently assembled with the same and with said driving and driven members to constitute said joint.

4. A cushioned universal joint of the type described comprising driving and driven members each having axially extending external torque arms provided with angular faces, the arms of said respective members being arranged in angularly alternating and axially overlapping relation to one another, a star-like center member interposed between said members for transmitting torque from the driving member to the driven member regardless of axial misalinement of the members, said center member being otherwise drivingly unconnected to said members and having radially projecting, axially elongated fingers disposed between the adjacent faces of alternate arms on said coacting members in spaced relation thereto, the side faces of said fingers and the adjacent torque arms being disposed at an angle to one another to define outwardly divergent spaces between the adjacent fingers and arms, an elastic cushioning element having outwardly divergent sides disposed under compression in the space between the faces of each arm and the fingers adjacent the same, and means to maintain the cushioning elements in predetermined axial relation and means for securing the elastic cushioning elements against axial displacement relative to the arms of one of said members and permitting axial sliding displacement relative to the arms of the other member, said center member being structurally separate and distinct from said cushioning elements and independently assembled with the same and with said driving and driven members to constitute said joint.

5. A cushioned universal joint of the type described comprising driving and driven members each having axially extending external torque arms of angular section, the arms of said respective members being arranged in angularly alternating and axially overlapping relation to one another, a star-like center member interposed between said members for transmitting torque from the driving member to the driven member regardless of axial misalinement of the members, said center member being otherwise drivingly unconnected to said members and having radially projecting, axially elongated fingers the sides of which are non-radial of the axis of said last named member, said fingers being disposed between the adjacent sides of alternate arms on said coacting members in spaced relation thereto to define angular sided spaces between the fingers and arms, and an elastic cushioning element disposed under compression in the space between the sides of each arm and the fingers adjacent the same and means for securing the elastic cushioning elements against axial displacement relative to the arms of one of said members and permitting axial sliding displacement relative to the arms of the other member, said center member being structurally separate and distinct from said cushioning elements and independently assembled with the same and with said driving and driven members to constitute said joint.

6. A cushioned torque coupling of the character described comprising rotatable driving and driven members having angularly alternating and axially overlapping torque arms parallel to the axes of the respective members, a generally cruciform center member having radially projecting arms of substantial axial dimension disposed between adjacent arms of said driving and driven members and coextensive in length with the axially overlapping area of the latter, the sides of said last named arms being angled relative to one another, defining angular sided spaces between the same and the adjacent torque arms and cushioning elements interposed under compression on either side of said center member arms in the spaces between the same and the adjacent torque arms for yielding transmission of torque therebetween, said center member being otherwise idle and drivingly disconnected from said driving and driven members.

7. A cushioned universal joint, comprising rotatable driving and driven members attachable to driving and driven shaft sections respectively, said members each having torque transmission arms disposed radially equidistant from the axis of said members in alternately staggered angular arrangement, the arms of the respective members overlapping axially a substantial distance and being of rectangular V section with the apices thereof directed inwardly toward one another, a torque transmission assembly interposed between the adjacent alternating arms of said respective members, comprising a center member disposed centrally of the coacting arms and axially coextensive with the area of overlap of said arms, said center member having equally spaced radially projecting torque transmission elements, cushioning units of general V configuration disposed between said arms and said torque transmission element of the center member in the space intermediate the adjacent radial elements of the latter, and means for preventing axial displacement of said cushion units and member, said units including elastic body sections and angular L shaped metal plates bonded to the opposite sides thereof and in axially restrained engagement with the arms and center member respectively, said center member being structurally separate and distinct from said cushioning units and independently assembled with the same and with said driving and driven members to constitute said joint, the center member maintaining said units in predetermined radial and angular operative relation to one another and to said arms transmitting torque between the cushioning units on opposite sides of the elements thereof, but being otherwise dynamically inactive in the operation of the joint.

8. A cushioned universal joint comprising rotatable driving and driven members attachable to driving and driven shaft sections respectively, said members each having torque transmission arms disposed radially equidistant from the axis of said members in alternately staggered angular arrangement, the arms of the respective members overlapping axially a substantial distance and being of rectangular V section with the apices thereof directed inwardly toward one another, a torque transmission assembly interposed between the adjacent alternating arms of said respective members, comprising center member disposed centrally of the coacting arms, said center member having equally spaced radially projecting torque transmission elements, and cushioning units of general V configuration disposed between said arms and said torque transmission element of center member in the space intermediate the adjacent radial element of the latter, said units including elastic body sections and angular L shaped metal plates bonded to the opposite sides thereof for engagement with the arms and center member respectively, said center member being structurally separate and distinct from said cushioning units and independently assembled with the same and with said driving and driven members to constitute said joint, the center member maintaining said units in predetermined radial and angular operative relation to one another and to said arms transmitting torque between the cushioning units on opposite sides of the elements thereof, but being otherwise dynamically inactive in the operation of the joint.

9. A cushioned universal joint comprising rotatable driving and driven members attachable to driving and driven shaft sections respectively, said members each having torque transmission arms disposed radially equidistant from the axis of said members in alternately staggered angular arrangement, the arms of the respective members overlapping axially a substantial distance, a torque transmission assembly interposed between the adjacent alternating arms of said respective members, comprising a center member disposed centrally of the coacting arms, said center member having equally radially projecting torque transmission elements, and cushioning units disposed between said arms and said torque transmission element of center member in the area intermediate the adjacent radial element of the latter, said units including elastic body sections and metal plates bonded to the opposite sides thereof for engagement with the arms and center member respectively, said center member being structurally separate and distinct from said cushioning units and independently assembled with the same and with said driving and driven members to constitute said joint, the center member maintaining said units in predetermined radial and angular operative relation to one another and to said arms transmitting torque between the cushioning units on opposite sides of the elements thereof, but being otherwise dynamically inactive in the operation of the joint.

10. A cushioned universal joint of the type described, comprising driving and driven members, each having axially extending torque arms, the arms of said respective members being arranged in angularly alternating and axially overlapping relation, a center member disposed between said members and having radially projecting fingers disposed between the adjacent faces of alternate arms and in spaced relation thereto, elastic cushioning means disposed in the space between the face of each arm and the finger adjacent thereto, said center member and the cushioning means being secured to each other against relative axial displacement, means for securing the cushioning means against axial displacement relative to the arms of one of said members and permitting axial displacement relative to the arms of the other member, said cushioning means having bonded thereto a metal surface for sliding engagement with said last mentioned arms.

ALFRED O. WILLIAMS.